US012711737B2

(12) United States Patent
Yang et al.

(10) Patent No.: US 12,711,737 B2
(45) Date of Patent: Aug. 18, 2026

(54) SYSTEMS AND METHODS FOR USING IMAGE DATA TO ANALYZE AN IMAGE

(71) Applicant: TORC Robotics, Inc., Blacksburg, VA (US)

(72) Inventors: Tianyi Yang, Ann Arbor, MI (US); Dalong Li, Troy, MI (US); Juncong Fei, Stuttgart (DE)

(73) Assignee: TORC Robotics, Inc., Blacksburg, VA (US)

( * ) Notice: Subject to any disclaimer, the term of this patent is extended or adjusted under 35 U.S.C. 154(b) by 606 days.

(21) Appl. No.: 18/325,878

(22) Filed: May 30, 2023

(65) Prior Publication Data

US 2024/0282080 A1 Aug. 22, 2024

Related U.S. Application Data

(60) Provisional application No. 63/446,263, filed on Feb. 16, 2023.

(51) Int. Cl.

| | |
|---|---|
| ***G06V 10/764*** | (2022.01) |
| ***G06T 7/70*** | (2017.01) |
| ***G06V 20/58*** | (2022.01) |

(52) U.S. Cl.
CPC .............. *G06V 10/764* (2022.01); *G06T 7/70* (2017.01); *G06V 20/58* (2022.01); *G06T 2207/20081* (2013.01); *G06T 2207/20084* (2013.01); *G06T 2207/30261* (2013.01)

(58) Field of Classification Search
CPC ...... G06V 10/764; G06V 10/82; G06V 20/58; G06T 7/70; G06T 2207/20081; G06T 2207/20084; G06T 2207/30261
See application file for complete search history.

(56) References Cited

U.S. PATENT DOCUMENTS

| | | | | |
|---|---|---|---|---|
| 10,037,471 | B2 | 7/2018 | Satzoda | |
| 10,318,822 | B2 | 6/2019 | Gao | |
| 10,832,062 | B1 | 11/2020 | Evans | |
| 10,956,796 | B2 | 3/2021 | Yan | |
| 11,689,750 | B2 | 6/2023 | Pisupati | |
| 11,699,237 | B2 | 7/2023 | Tariq | |
| 11,887,315 | B2 * | 1/2024 | Langley | G06F 18/231 |
| 2017/0220876 | A1 | 8/2017 | Gao | |
| 2020/0216075 | A1 * | 7/2020 | Park | G06V 10/764 |
| 2020/0387756 | A1 * | 12/2020 | Takehara | G06N 20/00 |
| 2021/0339767 | A1 * | 11/2021 | Karaman | G05B 13/0265 |
| 2022/0289239 | A1 | 9/2022 | Shenfeld | |
| 2022/0366175 | A1 | 11/2022 | Yu | |

(Continued)

*Primary Examiner* — John B Strege
(74) *Attorney, Agent, or Firm* — Armstrong Teasdale LLP

(57) ABSTRACT

Systems and methods for training artificial intelligence models based on sequences of image data are disclosed. The techniques described herein include generating, using an artificial intelligence model, a respective classification and a respective bounding box for an object depicted in each image of a sequence of images captured during operation of an autonomous vehicle; tracking the object in the sequence of images based on the respective bounding box of each image of the sequence of images and a tracking identifier corresponding to the object; determining a correction to the respective classification of an image of the sequence of images responsive to tracking the object in the sequence of images; and training the artificial intelligence model based on the correction.

14 Claims, 9 Drawing Sheets

500

Identify a respective classification and a respective bounding box generated using an artificial intelligence model for an object depicted in each image of a sequence of images captured during operation of an autonomous vehicle 505

Track the object in the sequence of images based on the respective bounding box of each image of the sequence of images and a tracking identifier corresponding to the object 510

Determine a correction to the respective classification of at least one image of the sequence of images responsive to tracking the object in the sequence of images 515

Train the artificial intelligence model based on the correction 520

(56) References Cited

U.S. PATENT DOCUMENTS

2023/0053786 A1* 2/2023 Moore ................. G06N 3/0464
2023/0112603 A1* 4/2023 Soomro .................... G06T 7/11
382/141
2024/0141624 A1* 5/2024 Torttila ..................... G06T 7/70
2025/0069238 A1* 2/2025 Li .......................... G06V 10/82

* cited by examiner

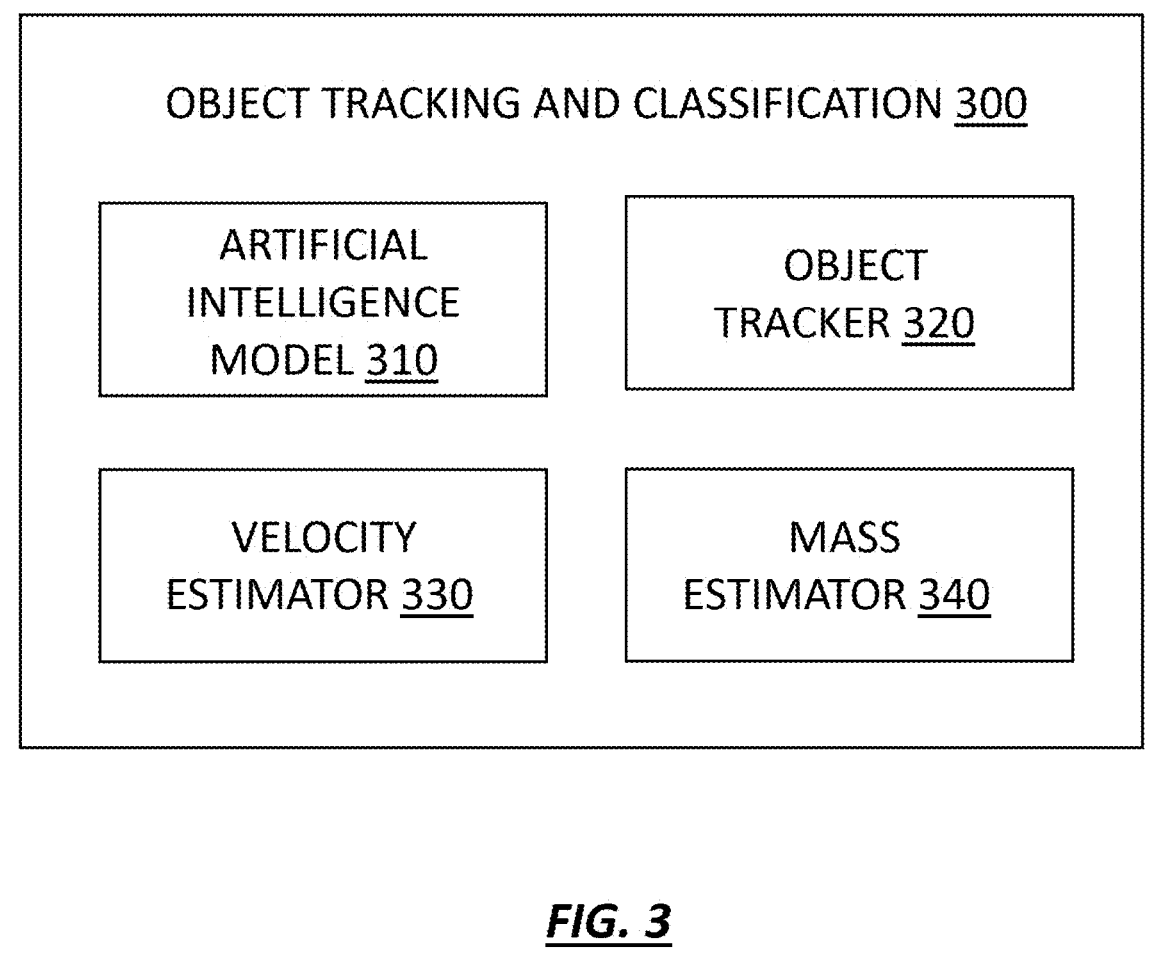

OBJECT TRACKING AND CLASSIFICATION 300

ARTIFICIAL INTELLIGENCE MODEL 310

OBJECT TRACKER 320

VELOCITY ESTIMATOR 330

MASS ESTIMATOR 340

*FIG. 3*

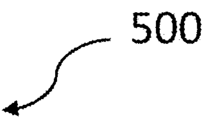

Identify a respective classification and a respective bounding box generated using an artificial intelligence model for an object depicted in each image of a sequence of images captured during operation of an autonomous vehicle 505

Track the object in the sequence of images based on the respective bounding box of each image of the sequence of images and a tracking identifier corresponding to the object 510

Determine a correction to the respective classification of at least one image of the sequence of images responsive to tracking the object in the sequence of images 515

Train the artificial intelligence model based on the correction 520

*FIG. 5*

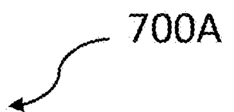
*FIG. 7A*

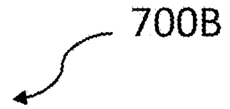
*FIG. 7B*

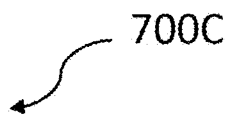
*FIG. 7C*

SYSTEMS AND METHODS FOR USING IMAGE DATA TO ANALYZE AN IMAGE

CROSS-REFERENCE TO RELATED APPLICATIONS

This application claims the benefit of priority to U.S. Application No. 63/446,263, filed on Feb. 16, 2023, which is hereby incorporated by reference in its entirety.

TECHNICAL FIELD

The present disclosure relates generally to autonomous vehicles and, more specifically, to systems and methods for training artificial intelligence models that may be used during autonomous vehicle operation.

BACKGROUND

The use of autonomous vehicles has become increasingly prevalent in recent years, with the potential for numerous benefits. Autonomous vehicles may execute artificial intelligence models to process image data or sensor data to detect obstacles while traveling. Due to the real-time nature of autonomous vehicle navigation, accurate detection of obstacles is paramount for safely operating autonomous vehicles on public roadways. However, conventional approaches for training artificial intelligence models result in sub-optimal classification of objects, particularly, objects that appear in images with occlusion, low resolution, and unusual yaw angles.

The manner in which cameras present on autonomous vehicles capture data often results in images that depict objects that are difficult to classify using conventional artificial intelligence models. The unpredictable nature of public roadways makes occasional occlusion unavoidable in certain circumstances, and objects may appear in images in unexpected ways or at low resolution during autonomous vehicle operation, particularly in objects that are distant from the autonomous vehicle. In such cases, conventional machine-learning techniques may fail to classify these objects. Inaccurate detection of obstacles may impede the navigational functionality of autonomous vehicles and pose risks to people, animals, and objects on public roadways.

SUMMARY

The systems and methods of the present disclosure may solve the problems set forth above and/or other problems in the art. The scope of the current disclosure, however, is defined by the attached claims, and not by the ability to solve any specific problem. Disclosed herein are methods and systems for determining corrections to classifications made by artificial intelligence models executed by autonomous vehicles. The corrections can be utilized for training artificial intelligence models that may be used during autonomous vehicle operation.

One embodiment of the disclosure relates to a method. The method includes identifying a respective classification and a respective bounding box generated using an artificial intelligence model for an object depicted in each image of a sequence of images captured during operation of an autonomous vehicle; tracking the object in the sequence of images based on the respective bounding box of each image of the sequence of images and a tracking identifier corresponding to the object; determining a correction to the respective classification of at least one image of the sequence of images responsive to tracking the object in the sequence of images; and training the artificial intelligence model based on the correction.

Tracking the object in the sequence of images may comprise determining a predicted position of the respective bounding box of a second image of the sequence of images based on the respective bounding box of a first image of the sequence of images. Determining the correction may comprise calculating a number of images in the sequence of images having the same respective classification for the object. The method may include executing a voting algorithm based on the number of images in the sequence of images having the same respective classification for the object.

The voting algorithm may comprise assigning, for the voting algorithm, a respective weight value to the respective classification of each image of the sequence of images in which the object was tracked. The method may include providing the artificial intelligence model to an autonomy system of the autonomous vehicle. Tracking the object in the sequence of images may comprise determining a distance of the object from the autonomous vehicle.

Another embodiment of the disclosure relates to a system. The system can include one or more processors configured to identify a respective classification and a respective bounding box generated using an artificial intelligence model for an object depicted in each image of a sequence of images captured during operation of an autonomous vehicle; track the object in the sequence of images based on the respective bounding box of each image of the sequence of images and a tracking identifier corresponding to the object; determine a correction to the respective classification of at least one image of the sequence of images responsive to tracking the object in the sequence of images; and train the artificial intelligence model based on the correction.

The system may determine a predicted position of the respective bounding box of a second image of the sequence of images based on the respective bounding box of a first image of the sequence of images. The system may calculate a number of images in the sequence of images having the same respective classification for the object. The system may track the object by executing a voting algorithm based on the number of images in the sequence of images having the same respective classification for the object.

The system may assign, for the voting algorithm, a respective weight value to the respective classification of each image of the sequence of images in which the object was tracked. The system may provide the artificial intelligence model to an autonomy system of the autonomous vehicle. The system may determine a distance of the object from the autonomous vehicle.

Yet another embodiment of the disclosure relates to an autonomous vehicle. The autonomous vehicle can include a processor configured to receive a sequence of images captured during operation of the autonomous vehicle; generate, using an artificial intelligence model, a respective classification and a respective bounding box for an object depicted in each image of the sequence of images; track the object in the sequence of images based on the respective bounding box of each image of the sequence of images and a tracking identifier corresponding to the object; determine a correction to the respective classification of at least one image of the sequence of images responsive to tracking the object in the sequence of images; and provide the correction to an autonomous navigation process of the autonomous vehicle.

The processor may determine a distance of the object from the autonomous vehicle. The processor may determine a predicted position of the respective bounding box of a second image of the sequence of images based on the respective bounding box of a first image of the sequence of images. The processor may calculate a number of images in the sequence of images having the same respective classification for the object.

The processor may track the object by executing a voting algorithm based on the number of images in the sequence of images having the same respective classification for the object. The processor may assign, for the voting algorithm, a respective weight value to the respective classification of each image of the sequence of images in which the object was tracked.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 is a schematic diagram of an object detection and tracking module of the autonomy system of the vehicle, according to an embodiment.

FIG. 5 is a flow diagram of an example method of training artificial intelligence models with improved accuracy using image data, according to an embodiment.

FIGS. 7A, 7B, and 7C are consecutive images in a sequence of images in which a misclassification occurs, according to an embodiment.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
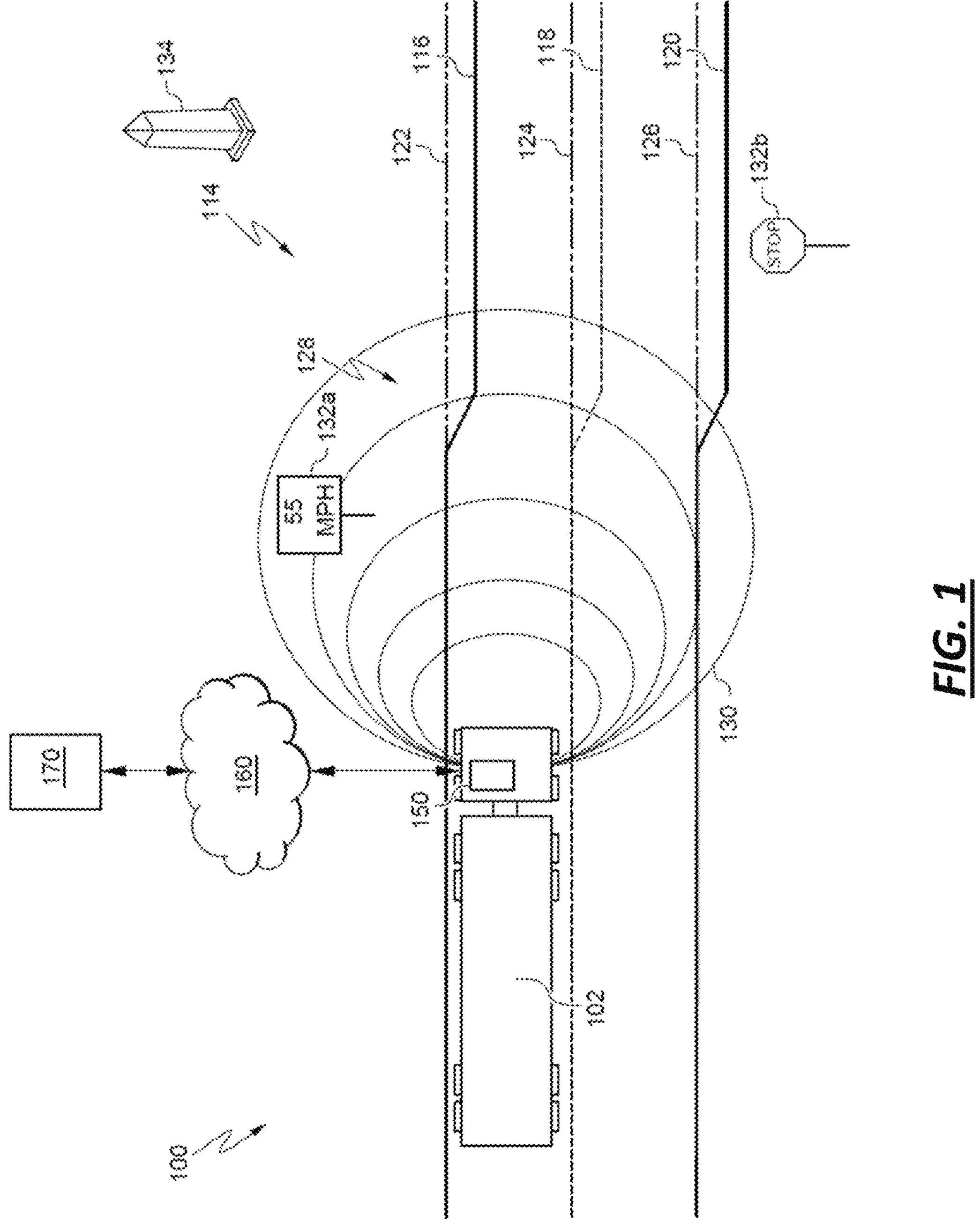
FIG. 1 is a bird's eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. The present disclosure sometimes refers to autonomous vehicles as ego vehicles. The autonomy system 150 may be structured on at least three aspects of technology: (1) perception, (2) maps/localization, and (3) behaviors planning and control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, etc.) and features of the roadway (e.g., lane lines) around truck 102, and classify the objects in the road distinctly.

The maps/localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map.

Once the systems on the truck 102 have determined its location with respect to the digital map features (e.g., location on the roadway, upcoming intersections, road signs, etc.), the truck 102 can plan and execute maneuvers and/or routes with respect to the features of the digital map. The behaviors, planning, and control aspects of the autonomy system 150 may be configured to make decisions about how the truck 102 should move through the environment to get to its goal or destination. It may consume information from the perception and maps/localization modules to know where it is relative to the surrounding environment and what other objects and traffic actors are doing.

FIG. 1 further illustrates an environment 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous having varying degrees of autonomy or autonomous functionality.

Figure 2:
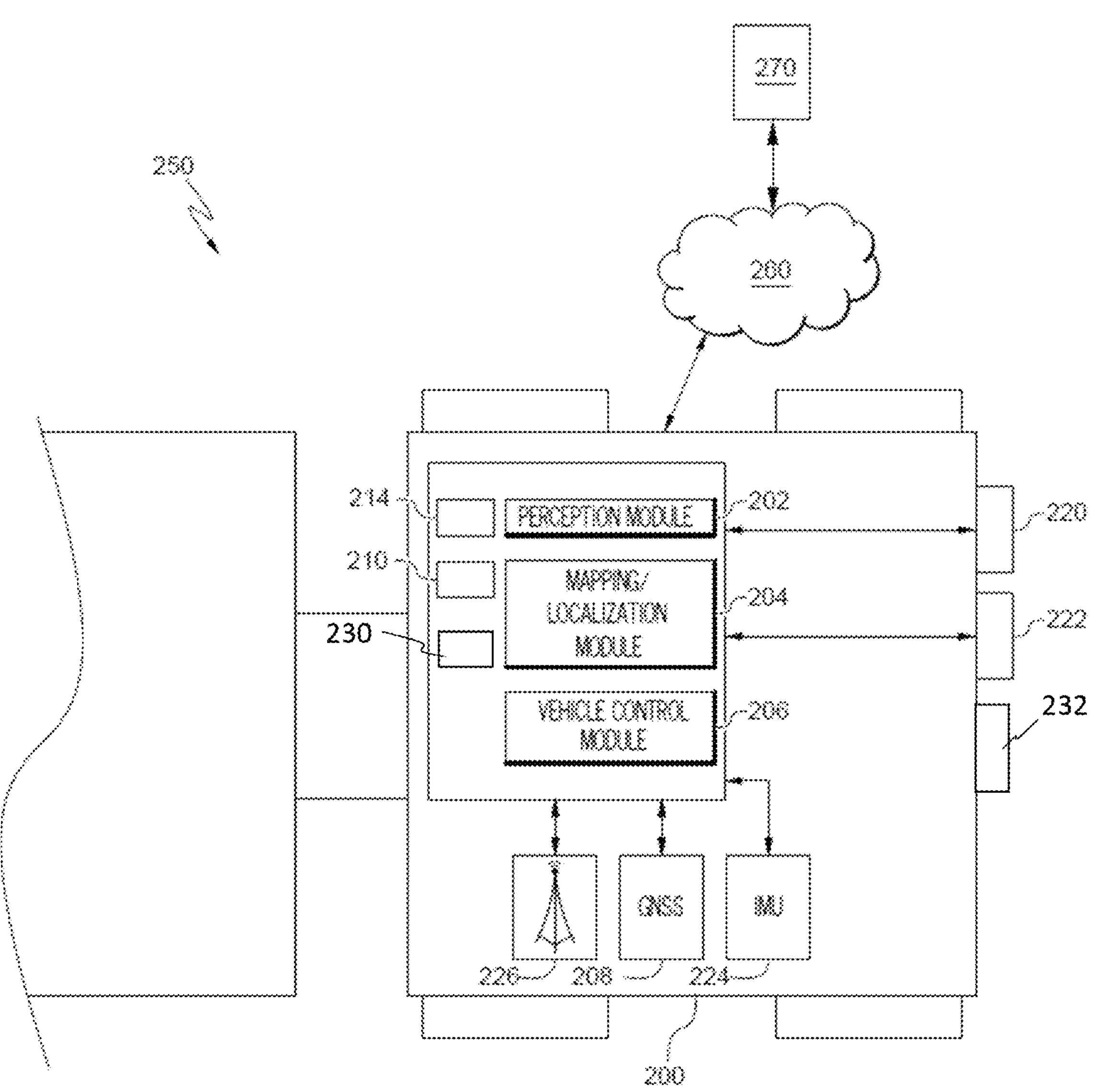
FIG. 2 is a schematic of the autonomy system of the vehicle, according to an embodiment.

With reference to FIG. 2, an autonomy system 250 may include a perception system including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As show in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., forward of the truck 102) or may surround 360 degrees of the truck 102. In some embodiments, the image data generated by the camera system(s) 220 may be sent to the perception module 202 and stored, for example, in memory 214. In some embodiments, the image data generated by the camera system(s) 220, as well as any classification data or object detection data (e.g., bounding boxes, estimated distance information, velocity information, mass information, etc.) generated by the object tracking and classification module 230, can be transmitted to the remote server 270 for additional processing (e.g., correction of detected misclassifications from the image data, training of artificial intelligence models, etc.).

The LiDAR system 222 may include a laser generator and a detector and can send and receive a LiDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model (s) through, for example, surface reconstruction. Collectively, the LiDAR system 222 and the camera system 220 may be referred to herein as "imaging systems."

The radar system 232 may estimate strength or effective mass of an object, as objects made out of paper or plastic may be weakly detected. The radar system 232 may be based on 24 GHZ, 77 GHz, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5g, etc.) In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260 and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck. Various other known circuits may be associated with the autonomy system 250, including signal-conditioning circuitry, communication circuitry, actuation circuitry, and other appropriate circuitry.

Figure 6:
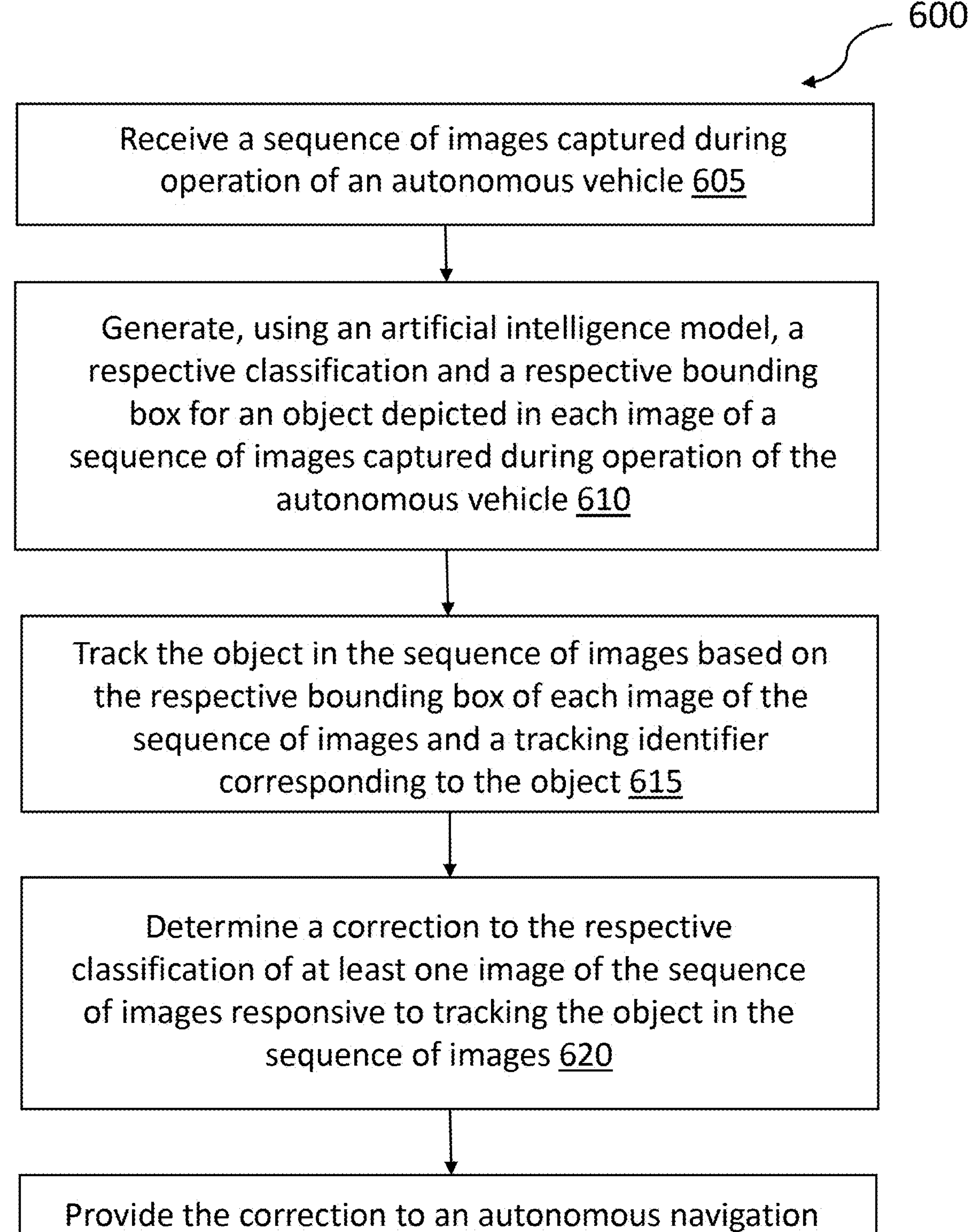
FIG. 6 is a flow diagram of correcting output of artificial intelligence models executing during autonomous vehicle operation, according to an embodiment.

The memory 214 of autonomy system 250 may store data and/or software routines that may assist the autonomy system 250 in performing its functions, such as the functions of the perception module 202, the mapping/localization module 204, the vehicle control module 206, an object tracking and classification module 230, the method 500 described herein with respect to FIG. 5, and the method 600 described herein with respect to FIG. 6. Further, the memory 214 may also store data received from various inputs associated with the autonomy system 250, such as perception data from the perception system. For example, the memory 214 may store image data generated by the camera system(s) 220, as well as any classification data or object detection data (e.g., bounding boxes, estimated distance information, velocity information, mass information, etc.) generated by the object tracking and classification module 230.

As noted above, perception module 202 may receive input from the various sensors, such as camera system 220, LiDAR system 222, GNSS receiver 208, and/or IMU 224 (collectively "perception data") to sense an environment surrounding the truck and interpret it. To interpret the surrounding environment, the perception module 202 (or "perception engine") may identify and classify objects or groups of objects in the environment. For example, the truck 102 may use the perception module 202 to identify one or more objects (e.g., pedestrians, vehicles, debris, etc.) or features of the roadway 114 (e.g., intersections, road signs, lane lines, etc.) before or beside a vehicle and classify the objects in the road. In some embodiments, the perception module 202 may include an image classification function and/or a computer vision function. In some implementations, the perception module 202 may include, communicate with, or otherwise utilize the object tracking and classification module 230 to perform object detection and classification operations.

The system 100 may collect perception data. The perception data may represent the perceived environment surrounding the vehicle, for example, and may be collected using aspects of the perception system described herein. The perception data can come from, for example, one or more of the LiDAR system, the camera system, and various other externally-facing sensors and systems on board the vehicle (e.g., the GNSS receiver, etc.). For example, on vehicles having a sonar or radar system, the sonar and/or radar systems may collect perception data. As the truck 102 travels along the roadway 114, the system 100 may continually receive data from the various systems on the truck 102. In some embodiments, the system 100 may receive data periodically and/or continuously.

With respect to FIG. 1, the truck 102 may collect perception data that indicates presence of the lane lines 116, 118, 120. Features perceived by the vehicle should generally track with one or more features stored in a digital map (e.g., in the mapping/localization module 204). Indeed, with respect to FIG. 1, the lane lines that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario the vehicle approaches a new bend 128 in the road that is not stored in any of the digital maps onboard the truck 102 because the lane lines 116, 118, 120 have shifted right from their original positions 122, 124, 126.

The system 100 may compare the collected perception data with stored data. For example, the system may identify and classify various features detected in the collected perception data from the environment with the features stored in a digital map. For example, the detection systems may detect the lane lines 116, 118, 120 and may compare the detected lane lines with lane lines stored in a digital map. Additionally, the detection systems could detect the road signs 132*a*, 132*b* and the landmark 134 to compare such features with features in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 100 interacts with the various features. Based on the comparison of the detected features with the features stored in the digital map(s), the system may generate a confidence level, which may represent a confidence of the vehicle in its location with respect to the features on a digital map and hence, its actual location.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module (e.g., the object detection and classification module 230) that may be communicatively coupled to a repository of images or image data (e.g., visual data and/or point cloud data) which may be used to detect and classify objects and/or features in real time image data captured by, for example, the camera system 220 and the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.). The computer vision function may be embodied by a software module (e.g., the object detection and classification module 230) that may be communicatively coupled to a repository of images or image data (e.g., visual data and/or point cloud data), and may additionally implement the functionality of the image classification function.

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200, and may correlate features of the sensed environment with details (e.g., digital representations of the features of the sensed environment) on the one or more digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connection to an external network during the mission. A centralized mapping system may be accessible via network 260 for updating the digital map(s) of the mapping/localization module 204. The digital map may be built through repeated observations of the operating environment using the truck 200 and/or trucks or other vehicles with similar functionality. For instance, the truck 200, a specialized mapping vehicle, a standard autonomous vehicle, or another vehicle, can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it onboard and use it within its mapping/localization module 204. Hence, the truck 200 and other vehicles (e.g., a fleet of trucks similar to the truck 200) can generate, maintain (e.g., update), and use their own generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck. For example, once the systems on the truck have determined its location with respect to map features (e.g., intersections, road signs, lane lines, etc.) the truck may use the vehicle control module 206 and its associated systems to plan and execute maneuvers and/or routes with respect to the features of the environment. The vehicle control module 206 may make decisions about how the truck will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck. The steering system may be any combination of mechanisms configured to adjust the heading or direction of the truck. The brake system may be, for example, any combination of mechanisms configured to decelerate the truck (e.g., friction braking system, regenerative braking system, etc.) The vehicle control module 206 may be configured to avoid obstacles in the environment surrounding the truck and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

FIG. 3 shows an object tracking and classification module 300 of system 100, 250. Object tracking and classification module 300 includes artificial intelligence model 310, object tracker 320, velocity estimator 330, and effective mass estimator 340. These components of object detecting and tracking module 300 may be either or both software-based components and hardware-based components. In some embodiments, one or more components of the object tracking and classification module 300 may be stored and executed by a remote server (e.g., remote server 170 of FIG. 1, remote server 270 of FIG. 2, remote server 410*a* of FIG. 4, etc.).

In an embodiment, object tracking and classification module 230, 300 executes the artificial intelligence model 310 to detect and classify objects in sequences of images captured by at least one sensor (e.g., a camera, a video camera or video streaming device, etc.) of the autonomous vehicle. In some implementations, the artificial intelligence model 310 can be executed in response to receiving an image from at least one sensor of the autonomous vehicle. The artificial intelligence model 310 can be or may include one or more neural networks. The artificial intelligence model 310 can be a single shot multi-box detector, and can process an entire input image in one forward pass. Processing the entire input image in one forward pass improves processing efficiency, and enables the artificial intelligence model 310 to be utilized for real-time or near real-time autonomous driving tasks.

In some embodiments, the input to the artificial intelligence model 310 may be pre-processed, or the artificial intelligence model 310 itself may perform additional processing on the input data. For example, an input image to the artificial intelligence model 310 can be divided into a grid of cells of a configurable (e.g., based on the architecture of the artificial intelligence model 310) size. The artificial intelligence model 310 can generate a respective prediction (e.g., classification, object location, object size/bounding box, etc.) for each cell extracted from the input image. As such, each cell can correspond to a respective prediction, presence, and location of an object within its respective area of the input image. The artificial intelligence model 310 may also generate one or more respective confidence values indicating a level of confidence that the predictions are correct. If an object represented in the image spans multiple cells, the cell with the highest prediction confidence can be utilized to detect the object. The artificial intelligence model 310 can output bounding boxes and class probabilities for each cell, or may output a single bounding box and class probability determined based on the bounding boxes and class probabilities for each cell. In some embodiments, the class and bounding box predictions are processed by non-maximum suppression and thresholding to produce final output predictions.

The artificial intelligence model 310 may be or may include a deep convolutional neural network (CNN), which may include one or more layers that may implement machine-learning functionality. The one or more layers can include, in a non-limiting example, convolutional layers, max-pooling layers, activation layers and fully connected layers, among others. Convolutional layers can extract features from the input image (or input cell) using convolution operations. The convolutional layers can be followed, for example, by activation functions (e.g., a rectified linear activation unit (ReLU) activation function, exponential linear unit (ELU) activation function, etc.), model. The convolutional layers can be trained to process a hierarchical representation of the input image, where lower level features are combined to form higher-level features that may be utilized by subsequent layers in the artificial intelligence model 310.

The artificial intelligence model 310 may include one or more max-pooling layers, which may down-sample the feature maps produced by the convolutional layers, for example. The max-pooling operation can replace the maximum value of a set of pixels in a feature map with a single value. Max-pooling layers can reduce the dimensionality of data represented in the artificial intelligence model 310. The artificial intelligence model 310 may include multiple sets of convolutional layers followed by a max-pooling layer, with the max-pooling layer providing its output to the next set of convolutional layers in the artificial intelligence model. The artificial intelligence model 310 can include one or more fully connected layers, which may receive the output of one or more max-pooling layers, for example, and generate predictions as described herein. A fully connected layer may include multiple neurons, which perform a dot product between the input to the layer and a set of trainable weights, followed by an activation function. Each neuron each neuron in a fully connected layer can be connected to all neurons or all input data of the previous layer. The activation function can be, for example, a sigmoid activation function that produces class probabilities for each object class for which the artificial intelligence model is trained. The fully connected layers may also predict the bounding box coordinates for each object detected in the input image.

The artificial intelligence model 310 may include or may utilize one or more anchor boxes to improve the accuracy of its predictions. Anchor boxes can include predetermined boxes with different aspect ratios that are used as references for final object detection predictions. The artificial intelligence model 310 can utilize anchor boxes to ensure that the bounding boxes it outputs have the correct aspect ratios for the objects they are detecting. The predetermined anchor boxes may be pre-defined or selected based on prior knowledge of the aspect ratios of objects that the model will encounter in the images captured by the sensors of autonomous vehicles. The size and aspect ratios of anchor boxes can be can determined based on statistical analysis of the aspect ratios of objects in a training dataset, for example. The anchor boxes may remain fixed in size and aspect ratio during both training and inference, and may be chosen to be representative of the objects in the target dataset.

The artificial intelligence model 310 may be trained at one or more remote servers (e.g., the remote server 170, the remote server 270, the remote server 410*a*, etc.) using any suitable machine-learning training technique, including supervised learning, semi-supervised learning, self-supervised learning, or unsupervised learning, among other techniques. In an example training process, the artificial intelligence model 310 can be trained using a set of training data that includes images of objects and corresponding ground truth data specifying the bounding boxes and classifications for those objects. The images used in the training data may be received from autonomous vehicles described herein, and the ground-truth values may be user-generated through observations and experience to facilitate supervised learning. In some embodiments, the training data may be pre-processed via any suitable data augmentation approach (e.g., normalization, encoding, any combination thereof, etc.) to produce a new dataset with modified properties to improve model generalization using ground truth.

The object tracker 320 may track objects detected in the sequences of images by the artificial intelligence model 310. The object tracker 320 may perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.). To do so, the object tracker 320 may execute a discriminative correlation filter tracker with channel and spatial reliability of tracker (CSRT) to predict a position and size of a bounding box in a second image given a first image (and corresponding bounding box) as input. In some embodiments, the object tracker 320 may utilize alternative tracking algorithms, including but not limiting to Boosting, Multiple Instance Learning (MIL), or Kernelized Correlation Filter (KCF), among others.

The object tracker 320 can determine that an object has been detected in a first image of a sequence of images captured by the sensors of the autonomous vehicle. If the object has not appeared in any previous images (e.g., a tracking process has failed to associate the object with a previously tracked object in previous images), the object tracker 320 can generate a tracking identifier for the object, and begin a new tracking process for the object in the first image and subsequent images in the sequence of images. The object tracker 320 can utilize the CSRT algorithm to learn a set of correlated filters that represent detected object and its appearance in the first image, and update these filters in each subsequent image to track the object in the subsequent images. The correlation between the filters and the image is maximized to ensure that the object is accurately located in each image, while the correlation with the background is minimized to reduce false positive detections. In each subsequent incoming image (e.g., as is it captured, or as the object tracker 320 iterates through a previously captured sequence of images, etc.), the object tracker 320 can output the predicted position and size of a bounding box for the object in the subsequent image, and compare the predicted bounding box with the actual bounding box (e.g., generated by the artificial intelligence model 310) in the subsequent image.

The object tracker 320 can associate the newly detected object with the generated tracking identifier if the Intersection over Union (IOU) of the predicted bounding box and the actual bounding box is greater than a predetermined value. The object tracker 320 can calculate the IOU as the ratio of the area of the intersection of two bounding boxes to the area of their union. To calculate the IOU, the object tracker 320 can determine the coordinates of the top-left and bottom-right corners of the overlapping region between the two bounding boxes (e.g., by subtracting determined coordinates of each bounding box). Then, the object tracker 320 can calculate the width and height of the overlap and utilize the width and height to calculate the area of the overlap. The object tracker 320 can calculate the area of union as the sum of the areas of the two bounding boxes minus the area of their overlap, and then calculate the IOU as the ratio of the area of intersection to the area of the union.

In some implementations, the object tracker 320 can utilize the Kuhn-Munkres algorithm to perform matching of bounding boxes to existing tracking identifiers. The Kuhn-Munkres algorithm can be utilized to find the optimal assignment between the predicted bounding boxes and the detected bounding boxes that minimizes the sum of the costs (or maximizes the negation of the costs) associated with each assignment. The cost of an assignment may be for example, the IOU between the bounding boxes, or in some implementations, the Euclidean distance between the centers of the bounding boxes. When executing the Kuhn-Munkres algorithm, the object tracker 320 can create a cost matrix (or other similar data structure). Each element of the matrix can represent the cost of assigning a predicted bounding box to a detected bounding box. The cost matrix may represent a bipartite graph (e.g., an adjacency matrix with each edge indicated as a cost). The object tracker 320 can determine the optimal assignment (e.g., the tracking identifier to associate with the detected bounding boxes) by optimizing for the maximum sum of the negation of the cost matrix for the pairs of bounding boxes (e.g., a maximum weight matching for the weighted bipartite graph).

In some implementations, the object tracker 320 can execute the Kuhn-Munkres algorithm to determine the best matching pairs within the bipartite graph. To do so, the object tracker 320 can assign each node in the bipartite graph a value that represents the best case of matching in the bipartite graph. For any two connected nodes in the bipartite graph, that the assigned value of two nodes is larger or equal to the edge weight. In this example, each node in the bipartite graph represents a predicted bounding box or a detected bounding box, and the predicting bounding boxes can only match to the detected bounding boxes, or vice versa. In some implementations, the values can be assigned to each of the nodes representing predicted bounding boxes, and the node value of the nodes in the bipartite graph that represent detected bounding boxes can be assigned to a node value of zero.

When executing the Kuhn-Munkres algorithm, the object tracker 320 can continuously iterate through each of the nodes in the bipartite graph determined for the cost matrix to identify an augmenting path starting from unmatched edges at the node and ending in another unmatched edge. The object tracker 320 can take the negation of the augmenting path, to identify one or more matching nodes. In some cases, when executing the Kuhn-Munkres algorithm, the object tracker 320 may be unable to resolve a perfect match through negation of the augmenting path. For the unsuccessful augmenting path, the object tracker 320 can identify all the related nodes (e.g., nodes corresponding to predicted bounding boxes) and calculate a minimum amount by which to decrease their respective node value to match with their second candidate (e.g., a node representing a corresponding detected bounding box). In order to keep the sum of linked nodes the same, the amount by which the node values are increased can be added to nodes to which said nodes are matched. In some implementations, the Kuhn-Munkres algorithm can be executed when the number of predicted bounding boxes and the number of detected bounding boxes is the same. If the number of predicted bounding boxes and the number of detected bounding boxes is different, the object tracker 320 can generate placeholder data representing fake bounding boxes to satisfy the requirements of the Kuhn-Munkres algorithm.

In some implementations, the object tracker 320 can implement an occlusion strategy, which handles cases where tracking fails for two or more consecutive images. One occlusion strategy is to delete or remove the tracking identifier when an object fails to appear (or be correctly tracked) in a subsequent image in the sequence of images. Another occlusion strategy is to only delete the tracking identifier if an object has failed to be tracked for a predetermined number of images (e.g., two consecutive images, five consecutive images, ten consecutive images, etc.). This can enable the object tracker 320 to correctly detect and track objects even in cases where the artificial intelligence model 310 fails to detect an object that is present in the sequence of images for one or more consecutive images. The object tracker 320 may also execute one or more of the operations described in connection with FIGS. 5 and 6 to determine a correction to a classification of objects detected in the sequence of images.

Velocity estimator 330 may determine the relative velocity of target objects relative to the ego vehicle. Effective mass estimator 340 may estimate effective mass of target objects, e.g., based on object visual parameters signals from an object visual parameters component and object classification signals from a target object classification component. The object visual parameters component may determine visual parameters of a target object such as size, shape, visual cues and other visual features in response to visual sensor signals, and generates an object visual parameters signal. The target object classification component may determine a classification of a target object using information contained within the object visual parameters signal, which may be correlated to various objects, and generates an object classification signal. For instance, the target object classification component can determine whether the target object is a plastic traffic cone or an animal.

In some implementations, the object tracking and classification module 300 may include a cost analysis function module. The cost analysis function module may receive inputs from other components of object tracking and classification module 300 and generates a collision-aware cost function. The system 100, 250 may apply this collision-aware cost function in conjunction with other functions used in path planning. In an embodiment, the cost analysis function module provides a cost map that yields a path that has appropriate margins between the autonomous vehicle and surrounding target objects.

Objects that may be detected and analyzed by the object tracking and classification module 300 include moving objects such as other vehicles, pedestrians, and cyclists in the proximal driving area. Target objects may include fixed objects such as obstacles; infrastructure objects such as rigid poles, guardrails or other traffic barriers; and parked cars. Fixed objects, also herein referred to herein as static objects and non-moving objects can be infrastructure objects as well as temporarily static objects such as parked cars. Externally-facing sensors may provide system 100, 250 (and the object tracking and classification module 300) with data defining distances between the ego vehicle and target objects in the vicinity of the ego vehicle, and with data defining direction of target objects from the ego vehicle. Such distances can be defined as distances from sensors, or sensors can process the data to generate distances from the center of mass or other portion of the ego vehicle.

In an embodiment, the system 100, 250 collects data on target objects within a predetermined region of interest (ROI) in proximity to the ego vehicle. Objects within the ROI satisfy predetermined criteria for likelihood of collision with the ego vehicle. The ROI is alternatively referred to herein as a region of collision proximity to the ego vehicle. The ROI may be defined with reference to parameters of the vehicle control module 206 in planning and executing maneuvers and/or routes with respect to the features of the environment. In an embodiment, there may be more than one ROI in different states of the system 100, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

Figure 4:
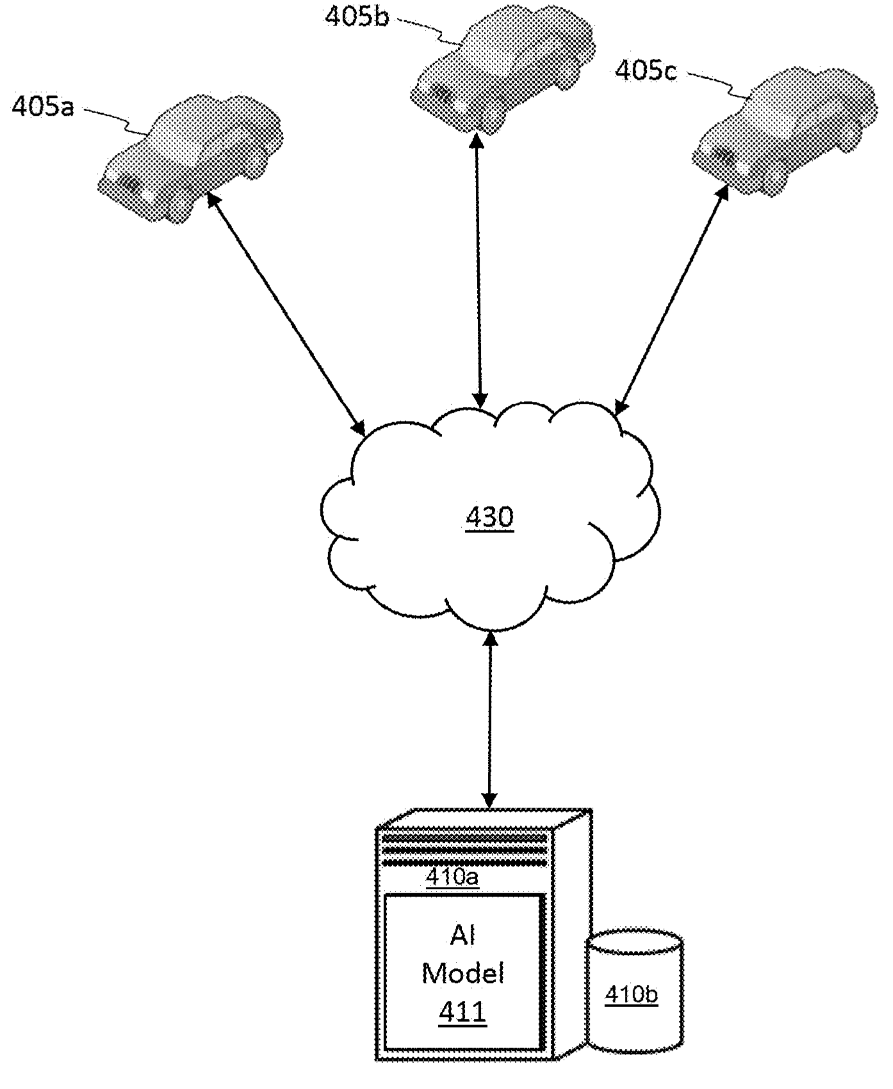
FIG. 4 is a schematic of a system for training artificial intelligence models with improved accuracy using image data, according to an embodiment.

FIG. 4 illustrates components a system 400 for training artificial intelligence models with improved accuracy using image data, according to an embodiment. The system 400 may include a remote server 410*a*, system database 410*b*, artificial intelligence models 411, and autonomous vehicles 405*a-d* (collectively or individually the autonomous vehicle (s) 405). In some embodiments, the system 400 may include one or more administrative computing devices that may be utilized to communicate with and configure various settings, parameters, or controls of the system 100. Various components depicted in FIG. 4 may be implemented to receive and process images captured by the autonomous vehicles 405 to train the artificial intelligence models 411, which can subsequently be deployed to the autonomous vehicles 405 to assist with autonomous navigation processes. The above-mentioned components may be connected to each other through a network 430. Examples of the network 430 may include, but are not limited to, private or public local-area-networks (LAN), wireless LAN (WLAN) networks, metropolitan area networks (MAN), wide-area networks (WAN), cellular communication networks, and the Internet. The network 430 may include wired and/or wireless communications according to one or more standards and/or via one or more transport mediums.

The system 400 is not confined to the components described herein and may include additional or other components, not shown for brevity, which are to be considered within the scope of the embodiments described herein.

The communication over the network 430 may be performed in accordance with various communication protocols such as Transmission Control Protocol and Internet Protocol (TCP/IP), User Datagram Protocol (UDP), and IEEE communication protocols. In one example, the network 430 may include wireless communications according to Bluetooth specification sets or another standard or proprietary wireless communication protocol. In another example, the network 430 may also include communications over a cellular network, including, e.g., a GSM (Global System for Mobile Communications), CDMA (Code Division Multiple Access), EDGE (Enhanced Data for Global Evolution) network.

The autonomous vehicles 405 may be similar to, and include any of the structure and functionality of, the autonomous truck 102 of FIG. 1. The autonomous vehicles 405 may include one or more sensors, communication interfaces or devices, and autonomy systems (e.g., the autonomy system 150 or the autonomy system 250, etc.). The autonomy systems of the autonomous vehicles 405 may include an object detection and tracking module (e.g., the object detection and tracking module 300 of FIG. 3). Each autonomous vehicles 405 can transmit sensor data and any data generated or processed by the autonomy system of the autonomous vehicle 405 to the remote server 410*a*. The autonomous vehicles 405 may transmit the information as the autonomous vehicle 405 operates, or after the autonomous vehicle 405 has ceased operation (e.g., parked, connected to a predetermined wireless or wired network, etc.).

The remote server 410*a* may receive sequences of images captured during operation of the autonomous vehicles 405, and perform the correction techniques described herein to generate data for training the artificial intelligence models 411. In some embodiments, the remote server 410*a* can include, or implement any of the functionality of, the object detection and tracking module 300 of FIG. 3. For example, the remote server 410*a* may receive sequences of images received from the autonomous vehicles 405*a*, and store the sequences of images in the system database 110*b*. The remote server 410*a* can store the sequences of images in association with metadata received from or generated based on communications with the autonomous vehicles 405. The metadata may include, for example, an identifier of autonomous vehicle 405, a timestamp corresponding to one or of the images or the sequence of images, bounding boxes detected by the autonomy system 250 of the autonomous vehicle 405, classifications determined by the autonomy system 250 of the autonomous vehicle 405, tracking identifiers corresponding to detected bounding boxes, distance information for detected objects in the sequences of images, any sensor data described herein, among other metadata.

The remote server 410*a* can implement the functionality described in connection with FIG. 5 to determine one or more corrections to classifications generated by the autonomous vehicles 405. The corrections can be utilized as additional ground truth data for training the artificial intelligence model, which can be generated by the remote server 410*a* and stored in the system database 410*b*. The corrections can be determined, as described herein, by utilizing tracking information (e.g., the tracking identifiers and the bounding boxes to which they correspond) associated with objects depicted in sequences of images. The remote server 410*a* can determine that a classification of a tracked object in an image may not match other classifications within the sequence of images. The remote server 410*a* can perform a voting algorithm using the classifications corresponding to the detected object in each image of a sequence of images in which the object was detected and tracked (e.g., associated with a common tracking identifier).

In some implementations, the remote server 410*a* can utilize a majority-voting algorithm, in which the classification that occurs most common in the corresponding images is chosen as the corrected classification. In some implementations, the remote server 410*a* can utilize a normalized weighted voting algorithm. When executing the normalized weighted voting algorithm, the remote server 410*a* can divide the instances in which the object was detected in the sequence of images groups according to the distance of the object from the autonomous vehicle 405 that captured the sequence of images. The distance can be determined by the autonomous vehicle 405 or the remote server 410*a* based sensor data captured by the sensors of the autonomous vehicle 405. The remote server 410*a* can determine a weight value for each group, corresponding to the classification accuracy at different predetermined distances, for example. The remote server 410*a* can determine a candidate class label based on confidence values (e.g., generated by the artificial intelligence model that detected the bounding box in the sequence of images) associated with the detected bounding box or classification. The remote server 410*a* can determine a weight value for the candidate class label of each group based on a distance coefficient for the respective group. The remote server 410*a* can calculate the weighted sum of class confidence to determine the voted class label among the groups. In an embodiment, the distance coefficient is a hyper parameter, which can be tuned according to the classification performance of the various artificial intelligence models described herein (e.g., the artificial intelligence model 310) at different distance ranges.

In some implementations, the remote server 410*a* can detect one or more images in a consecutive sequence of images in which detection of an object (e.g., generation of an accurate bounding box) has failed. For example, the remote server 410*a* can iterate through a sequence of images and identify whether bounding boxes corresponding to a common tracking identifier appear in consecutive images. If an image between two images is missing a bounding box for the common tracking identifier of an object, the remote server 410*a* can determine that the respective bounding box is missing. The remote server 410*a* can generate a corrected bounding box by estimating the position and size of the bounding box for the image. To do so, the remote server 410*a* can execute the CSRT tracking algorithm to estimate the position and position and size of a bounding box for the object in the image given the previous image in the sequence in which the object was correctly detected.

The artificial intelligence models 411 may be stored in the system database 410*b* and may include artificial intelligence models that can detect and classify objects and images. For example, the artificial intelligence models 411 can include the artificial intelligence model 310 of FIG. 3 for one or more autonomous vehicles 405. In some implementations, the artificial intelligence models 411 may be generated or trained for on different types of cameras, autonomous vehicles 405, or environments. For example, the artificial intelligence models 411 may include multiple artificial intelligence models, each of which may be trained for a specific type of autonomous vehicle 405, a specific set of sensors deployed on an autonomous vehicle 405, or a particular environment in which one or more autonomous vehicles 405 may be deployed. One or more of the artificial intelligence models 411 may be derived from a similar base model, which may be fine-tuned for particular applications.

The artificial intelligence models 411 can be or may include one or more neural networks. The artificial intelligence models 411 can be a single shot multi-box detector, and can process an entire input image in one forward pass. Processing the entire input image in one forward pass improves processing efficiency, and enables the artificial intelligence models 411 to be utilized for real-time or near real-time autonomous driving tasks. In some embodiments, the input to the artificial intelligence models 411 may be pre-processed, or the artificial intelligence models 411 itself may perform additional processing on the input data. For example, an input image to the artificial intelligence models 411 can be divided into a grid of cells of a configurable (e.g., based on the architecture of the artificial intelligence models 411) size. The artificial intelligence models 411 can generate a respective prediction (e.g., classification, object location, object size/bounding box, etc.) for each cell extracted from the input image. As such, each cell can correspond to a respective prediction, presence, and location of an object within its respective area of the input image.

The artificial intelligence models 411 may also generate one or more respective confidence values indicating a level of confidence that the predictions are correct. If an object represented in the image spans multiple cells, the cell with the highest prediction confidence can be utilized to detect the object. The artificial intelligence models 411 can output bounding boxes and class probabilities for each cell, or may output a single bounding box and class probability determined based on the bounding boxes and class probabilities for each cell. In some embodiments, the class and bounding box predictions are processed by non-maximum suppression and thresholding to produce final output predictions. The artificial intelligence models 411 may be or may include a deep CNN, which may include one or more layers that may implement machine-learning functionality. The one or more layers can include, in a non-limiting example, convolutional layers, max-pooling layers, activation layers and fully connected layers, among others.

The remote server 410*a* can train one or more of the artificial intelligence models 411 using training data stored in the system database 410*b*. In an example training process, the artificial intelligence models 411 can be trained using a set of training data that includes images of objects and corresponding ground truth data specifying the bounding boxes and classifications for those objects. The images used in the training data may be received from the autonomous vehicles 405, and the ground-truth values may be user-generated through observations and experience to facilitate supervised learning. In some embodiments, at least a portion of the ground truth data can be generated by the remote server 410*a* using the correction techniques described herein. In some embodiments, the training data may be pre-processed via any suitable data augmentation approach (e.g., normalization, encoding, any combination thereof, etc.) to produce a dataset with modified properties to improve model generalization using the ground truth.

The remote server 410*a* can train an artificial intelligence model 411, for example, by performing supervised learning techniques to adjust the parameters of the artificial intelligence model 411 based on a loss computed from the output generated by the artificial intelligence model 411 and ground truth data corresponding to the input provided to the artificial intelligence model 411. Inputs to the artificial intelligence model 411 may include images or sequences of images captured during operation of autonomous vehicles 405, and stored in the system database 110*b*. The artificial intelligence model 411 may be trained on a portion of the training data using a suitable optimization algorithm, such as stochastic gradient descent. The remote server 410*a* can train the artificial intelligence model 411 by minimizing the calculated loss function by iteratively updating the trainable parameters of the artificial intelligence model 411 (e.g., using backpropagation, etc.). The remote server 410*a* can evaluate the artificial intelligence model 411 on a held-out portion of the training data (e.g., validation set that was not used to train the artificial intelligence model 411) to assess the performance of the artificial intelligence model 411 on unseen data. The evaluation metrics used to assess the model's performance may include accuracy, precision, recall, and F1 score, among others.

The remote server 410*a* can train an artificial intelligence model 411 until a training termination condition is met. Some non-limiting training termination conditions include a maximum number of iterations being met or a predetermined performance threshold being met. The performance threshold can be satisfied when the artificial intelligence model 411 reaches a certain level of accuracy, F1 score, precision, recall, or any other relevant metric on a validation set. The remote server 410 can provide the trained artificial intelligence model 411 one or more autonomous vehicles 405 for which the artificial intelligence model 411 was trained. The autonomous vehicle(s) 405 can then utilize the artificial intelligence model 411 to detect and classify objects in real-time or near real-time, as described herein.

The remote server 410*a* can update one or more of the artificial intelligence models 411 (e.g., by retraining, fine-tuning, or other types of training processes) when sequences of images are received from the autonomous vehicles 405 and utilized to produce additional training data. The remote server 410*a* (or the autonomy systems of the autonomous vehicles 405) can generate the additional training data by determining corrections to classifications made by the artificial intelligence model executing on the autonomous vehicle. The corrected classifications and bounding boxes can be utilized as ground truth data for the images in the sequences of images to which they correspond. Further details of the correction and training process are described in connection with FIG. 5. Although the artificial intelligence models 411 can include neural networks trained using supervised learning techniques, it should be understood that any alternative and/or additional machine learning model(s) may be used to implement similar learning engines.

FIG. 5 is a flow diagram of an example method 500 of training artificial intelligence models with improved accuracy using image data, according to an embodiment. The steps of the method 500 of FIG. 5 may be executed, for example, by any of the processors, servers, or autonomous vehicles described in connection with the system 100, 250, and 400, according to some embodiments. The method 500 shown in FIG. 5 comprises execution steps 505-520. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously with one another.

The method 500 of FIG. 5 is described as being performed by a server, which may include remote server 410*a* depicted in FIG. 4. However, it should be understood that any device or system with one or more processors, may perform the steps of the method 500, including the processor 210 of the autonomy system 250 depicted in FIG. 2. However, in some embodiments, one or more of the steps may be performed by a different processor, server, or any other computing device. For instance, one or more of the steps may be performed via a cloud-based service including any number of servers, which may be in communication with the processor of the autonomous vehicle and/or its autonomy system.

Although the steps are shown in FIG. 5 having a particular order, it is intended that the steps may be performed in any order. It is also intended that some of these steps may be optional.

The method 500 may be executed to train or fine-tune artificial intelligence models that execute on autonomous vehicles. To do so, additional training data for the artificial intelligence model may be generated using a correction determined by the device performing the method 500. The correction may be a corrected classification of a detected object, or a corrected bounding box for an image in a sequence in which a depicted object was not detected. The correction can be utilized as ground truth data for the image (sometimes referred to as "soft" ground truth data), and can be utilized to fine-tune or retrain the artificial intelligence model. Additionally, these techniques can be utilized to correct object detection and classification in real-time or near real-time at an autonomous vehicle, to aid in autonomous vehicle navigation and obstacle avoidance.

At step 505, a server can identify a respective classification and a respective bounding box generated using an artificial intelligence model (e.g., the artificial intelligence model 310, the artificial intelligence model(s) 411, etc.) for an object depicted in each image of a sequence of images captured during operation of an autonomous vehicle (e.g., the truck 102, the autonomous vehicle 405, etc.). The sequence of images can include consecutively captured video frames, consecutively capture still-images, or other types of sequential image data. In an embodiment, the sequence of images can be ordered according to the time that the images were captured (e.g., ranked or sorted according to chronological order). In an embodiment, the sequence of images can be stored or provided to the server in a rosbag format. A rosbag is a collection of data (a "bag") in the robotic operating system (ROS) format, which can store image data, video data, audio data, as well as other information such as bounding boxes, classifications, confidence values, distance values, among other data described herein.

Identifying the respective classification and respective bounding box can include receiving a sequence of images, and the respective classification and respective bounding box for each image in the sequence, from an autonomous vehicle. The server may receive the data in a rosbag format, and extract the information therein to perform the present techniques. The autonomous vehicle can generate the bounding box and the classifications of objects depicted in images captured during vehicle operation. The sequences of images can correspond to images captured by cameras or other sensors mounted on the autonomous vehicle, which are utilized to assist in navigation of the autonomous vehicle during its operation. The sequences of images, and the corresponding bounding box, classification, and confidence data, may be packaged into a message format (e.g., a rosbag, etc.) and transmitted to the server from the autonomous vehicles via a network. The data may be transmitted while the autonomous vehicle is operating (e.g., driving on public or private roadways), or may be transmitted once the autonomous vehicle has stopped operating, and has parked and connected to wired or wireless network.

In some embodiments, the identifying the bounding box and classification of each image in a sequence of images can include executing an artificial intelligence model (e.g., the artificial intelligence model 310, the artificial intelligence models 411, etc.) maintained by the server using a received sequence of images as input. To do so, the server can provide each image as input to the artificial intelligence model, and execute the mathematical operations of each layer of the artificial intelligence model while propagating data through the model. The artificial intelligence model can generate the respective bounding box (e.g., a set of coordinates or dimensions, etc.) and the respective classification of the object as output. In an embodiment, the artificial intelligence model can generate one or more confidence values indicating a confidence value that the respective classification or bounding box for an object detected in an image is accurate (e.g., a confidence in the prediction made by the artificial intelligence model).

At step 510, the server can track an object depicted in the sequence of images based on the respective bounding box of each image of the sequence of images and a tracking identifier corresponding to the object. In an embodiment, a tracking identifier can be associated with each detected object that is tracked between images in a sequence of images based on a CSRT tracker. The CSRT tracker can be executed at the autonomous vehicle during its operation, or by the server, once the bounding boxes and classifications have been identified. In an embodiment where the tracking identifier has been assigned to each bounding box by the autonomous vehicle, tracking the object between images can include identifying consecutive collections of images in a sequence that depict the tracked object. These collections of images can be utilized in subsequent steps to determine corrections to inaccurate classifications or missing bounding boxes in one or more images of the sequence.

In an embodiment, the server can execute a tracking algorithm to associate detected bounding boxes with a tracking identifier by iterating through each image in a sequence of images. To do so, the server can execute, for example, a CSRT tracker to predict a position and size of a bounding box in a second image given a first image (and corresponding bounding box) in a sequence as input. In some embodiments, the server may utilize alternative tracking algorithms, including but not limiting to Boosting, MIL, or KCF, among others. At the start of the tracking process, the server can determine that an object has been detected in a first image of a sequence of images captured by the sensors of the autonomous vehicle. If the object has not appeared in any previous images (e.g., a tracking process has failed to associate the object with a previously tracked object in previous images), the server can generate a tracking identifier for the object, and begin a new tracking process for the object in the first image and subsequent images in the sequence of images.

The server can utilize the CSRT algorithm to learn a set of correlated filters that represent detected object and its appearance in the first image, and update these filters in each subsequent image to track the object in the subsequent images. The correlation between the filters and the image is maximized to ensure that the object is accurately located in each image, while the correlation with the background is minimized to reduce false positive detections. For each subsequent image (e.g., as the server iterates through the sequence of images, etc.), the server can output the predicted position of bounding box for the object in the subsequent image, and compare the predicted bounding box with the actual bounding box (e.g., generated by the artificial intelligence model 310) in the subsequent image.

The server can associate the detected object with the generated tracking identifier if the IOU of the predicted bounding box and the actual bounding box is greater than a predetermined value. The server can calculate the IOU as described herein. In some implementations, the server can utilize the Kuhn-Munkres algorithm to perform matching of bounding boxes to existing tracking identifiers using a cost matrix. The Kuhn-Munkres algorithm can be utilized to find the optimal assignment between the predicted bounding boxes and the detected bounding boxes that minimizes the sum of the costs (or maximizes the negation of the costs) associated with each assignment. The cost of an assignment may be for example, the IOU between the bounding boxes, or in some implementations, the Euclidean distance between the centers of the bounding boxes. When executing the Kuhn-Munkres algorithm, the server can create a cost matrix (or other similar data structure). Each element of the matrix can represent the cost of assigning a predicted bounding box to a detected bounding box. The cost matrix may represent a bipartite graph (e.g., an adjacency matrix with each edge indicated as a cost). The server can determine the optimal assignment (e.g., the tracking identifier to associate with the detected bounding boxes) by optimizing for the maximum sum of the negation of the cost matrix for the pairs of bounding boxes (e.g., a maximum weight matching for the weighted bipartite graph).

The server can execute the Kuhn-Munkres algorithm, as described herein, to associate each detected bounding box with each predicted bounding box in an image. In some implementations, the Kuhn-Munkres algorithm can be executed when the number of predicted bounding boxes and the number of detected bounding boxes is the same. If the number of predicted bounding boxes and the number of detected bounding boxes is different, the server can generate placeholder data representing fake bounding boxes to satisfy the requirements of the Kuhn-Munkres algorithm. In some implementations, the server can implement an occlusion strategy, which handles cases where tracking fails for two or more consecutive images. For example, the server may delete the tracking identifier if an object has failed to be tracked for a predetermined number of images (e.g., two consecutive images, five consecutive images, ten consecutive images, etc.). This can enable the server to correctly detect and track objects even in cases where the artificial intelligence model fails to detect an object that is present in the sequence of images for one or more consecutive images.

At step 515, the server can determine a correction to the respective classification of at least one image of the sequence of images responsive to tracking the object in the sequence of images. Corrections can be determined when a classification of tracked object changes among consecutive images of a sequence. Because images depict real-world objects, their classification cannot actually change in the environment. Therefore, a classification that changes in the sequence of images indicates that at least one classification for the object in the sequence is incorrect. To correct this inaccuracy, the server can implement a voting algorithm using the respective classifications of each image in which the object was detected (e.g., sharing a common tracking identifier).

One example of a voting algorithm is a majority voting algorithm, in which the classification that occurs most common in the images in which an object (e.g., sharing a common tracking identifier) is detected is chosen as the corrected classification. The corrected classification can then be stored in association with each image that has a bounding box identified by the respective tracking identifier for the object. This enables the server to correct multiple classifications of multiple images in a sequence upon executing the voting algorithm.

In some implementations, the server can utilize a normalized weighted voting algorithm. When executing the normalized weighted voting algorithm, the server can divide the instances in which the object was detected in the sequence of images into groups according to the distance of the object from the autonomous vehicle that captured the sequence of images. The distance of the object may be determined based on sensor data received from the autonomous vehicle with the sequence of images (e.g., in a rosbag, etc.). For example, the server may divide the sequence of images into seven groups, according to the distance of the detected object from the autonomous vehicle at the time each image was captured. The distance can be determined by the autonomous vehicle or the server based sensor data captured by the sensors of the autonomous vehicle. The server can determine a weight value for each group, corresponding to the classification accuracy at different predetermined distances, for example. The server can determine a candidate class label based on confidence values (e.g., generated by the artificial intelligence model that detected the bounding box in the sequence of images) associated with the detected bounding box or the respective classification.

The server can assign a weight to the candidate class label of each group according to the distance coefficient for the respective group. The server can calculate the weighted sum of class confidence to determine the voted class label, and utilize the voted class label as the corrected classification. In an embodiment, the distance coefficient is a hyper parameter, which can be tuned according to the classification performance of the various artificial intelligence models described herein (e.g., the artificial intelligence model 310) at different distance ranges. In some implementations, the server can detect one or more images in a consecutive sequence of images in which detection of an object (e.g., generation of an accurate bounding box) has failed. For example, the server can iterate through a sequence of images and identify whether bounding boxes corresponding to a common tracking identifier appear in consecutive images.

If one or more images between two images where an object was successfully detected are missing a bounding box for the common tracking identifier of an object, the server can determine that the respective bounding box is missing in those one or more images. In an embodiment, the server can maintain a frame count inside for each object to identify missed detections of the object in sequences of images. For example, for each detected object in a sequence of images, the server can store an identifier of an image in which a detected object first appears a second identifier of an image in which the object last appears in the sequence. Then, when the server processes the sequence of images, the server can identify whether a detected object left the field of view of the camera or is absent due to a missed detection. The server can generate a corrected bounding box for the object by estimating the position and size of the bounding box for the image in which the object failed to be detected. To do so, the server can execute the CSRT tracking algorithm (or another suitable tracking algorithm) to estimate the position and position and size of a bounding box for the object in the image given the previous image in the sequence in which the object was correctly detected.

The server can perform the aforementioned correction techniques for each object detected in the sequence of images. This may include correcting a classification for one object in an image, while keeping other classifications constant. In an embodiment, the server may determine corrections for multiple classifications of multiple objects in a sequence of images. The server can store the corrections in association with the respective images and sequences of images as a soft ground truth label for the object in the image. The soft ground truth labels can then be utilized in a supervised learning process to train, fine-tune, or otherwise update the artificial intelligence model that originally detected the objects in the corresponding sequence of images. The soft ground truth data can be stored as part of a training set (e.g., in the system database 110*b*, etc.).

At step 520, the server train the artificial intelligence model based on the correction. In an embodiment, training the artificial intelligence model may include fine-tuning or retraining the artificial intelligence model using training data that includes images associated with corrections determined in step 515. The training data may be generated by the server by incorporating an images (or sequences of images) that include corrections as ground truth data into an existing training set for the artificial intelligence model. In an embodiment, the server can store the images having corrections as a separate training set, which may be augmented using one or more data augmentation techniques to increase the size of the training set. The separate training set may be utilized to fine-tune the pre-trained artificial intelligence model using supervised learning techniques, or may be utilized to retrain the artificial intelligence model from scratch.

The server can train the artificial intelligence model using any suitable training technique, including supervised learning, semi-supervised learning, self-supervised learning, or another suitable technique. To train the artificial intelligence model, the server can iteratively update the trainable parameters of the artificial intelligence model based on a loss computed from the output generated by the artificial intelligence model and ground truth data corresponding to the input provided to the artificial intelligence model. The artificial intelligence model may be trained on a portion of the training data using a suitable optimization algorithm, such as stochastic gradient descent. The server can evaluate the artificial intelligence model on a held-out portion of the training data (e.g., validation set that was not used to train the artificial intelligence model) to assess the performance of the artificial intelligence model on unseen data. The evaluation metrics used to assess the model's performance may include accuracy, precision, recall, and F1 score, among others. In an embodiment, the server can execute the method 500 to generate sets of training data from sequences of images captured during autonomous vehicle operation, without necessarily requiring manual human input. Once the artificial intelligence model has been trained, the server can transmit the artificial intelligence model to one or more autonomous vehicles for use during autonomous operation.

FIG. 6 is a flow diagram of correcting output of artificial intelligence models executing during autonomous vehicle operation, according to an embodiment. The steps of the method 500 of FIG. 5 may be executed, for example, a processor of an autonomous vehicle, including any such autonomous vehicle or component described in connection with the system 100, 250, 300, and 400, according to some embodiments. The method 500 shown in FIG. 6 comprises execution steps 605-625. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously with one another.

The method 600 of FIG. 6 is described as being performed by a processor of an autonomous vehicle, such as the processor 210 of the autonomy system 250 depicted in FIG. 2. However, in some embodiments, one or more of the steps may be performed by a different processor, server, or any other computing device. For instance, one or more of the steps may be performed via a cloud-based service including any number of servers, which may be in communication with the processor of the autonomous vehicle and/or its autonomy system.

Although the steps are shown in FIG. 6 having a particular order, it is intended that the steps may be performed in any order. It is also intended that some of these steps may be optional. The method 600 may be executed to improve the perception performance of cameras mounted on autonomous vehicles by correcting incorrect classifications and reducing false negatives.

At step 605, the processor can receive a sequence of images captured during operation of an autonomous vehicle. The sequence of images may be captured by a camera system (e.g., the camera system 220) of the autonomous vehicle, and received via the processor as the images are captured (e.g., streamed to the processor, etc.). The images may be received consecutively as they are captured, and stored in one or more buffers in memory such that they can be processed in subsequent method steps. The images received by the processor can depict a FOV that of any angle or aspect, such that images of the areas ahead of, to the side, and behind the autonomous vehicle are captured. The images may depict objects, which may be classified and tracked using the techniques described herein.

At step 610, the processor can generate, using an artificial intelligence model (e.g., the artificial intelligence model 310), a respective classification and a respective bounding box for an object depicted in each image of a sequence of images captured during operation of the autonomous vehicle. Step 610 may be performed using operations similar to those described in connection with step 505 of FIG. 5. For example, the processor may execute the artificial intelligence model maintained by the server using the received sequence of images as input. To do so, the processor can provide each image as input to the artificial intelligence model, and execute the mathematical operations of each layer of the artificial intelligence model while propagating data through the model. The artificial intelligence model can generate the respective bounding box (e.g., a set of coordinates or dimensions, etc.) and the respective classification of the object as output. In an embodiment, the artificial intelligence model can generate one or more confidence values indicating a confidence value that the respective classification or bounding box for an object detected in an image is accurate (e.g., a confidence in the prediction made by the artificial intelligence model).

At step 615, the processor can track the object in the sequence of images based on the respective bounding box of each image of the sequence of images and a tracking identifier corresponding to the object. Step 615 may be performed using operations similar to those described in connection with step 510 of FIG. 5. For example, the processor can associate a tracking identifier can be associated each detected object that is tracked between images in a sequence of images based on a CSRT tracker. A respective tracking identifier can be generated for an object each time a new object appears in the sequence of images. Multiple tracking identifiers can be generated for an image if multiple objects are depicted in the image. In some embodiments, the processor may utilize alternative tracking algorithms, including but not limiting to Boosting, MIL, or KCF, among others.

The processor can track objects in the images as the images are received by the processor, for example, based on the positions and locations of previous bounding boxes in previously received images. To do so, the processor can execute the Kuhn-Munkres algorithm, for example, to perform matching of bounding boxes to existing tracking identifiers using a cost matrix, as described herein. Each element of the matrix can represent the cost of assigning a predicted bounding box to a detected bounding box. The cost matrix may represent a bipartite graph (e.g., an adjacency matrix with each edge indicated as a cost). In an embodiment, if the number of predicted bounding boxes and the number of detected bounding boxes is different, the server can generate placeholder data representing fake bounding boxes to satisfy the requirements of the Kuhn-Munkres algorithm. Tracking can be performed to associate each detected bounding box with a tracking identifier, which may correspond to a tracking identifier utilized in a previous image if the same object appeared in a previous image. The tracking identifier can be utilized to determine a correction to one or more classifications, as described herein.

At step 620, the processor can determine a correction to the respective classification of at least one image of the sequence of images responsive to tracking the object in the sequence of images. Step 620 may be performed using operations similar to those described in connection with step 515 of FIG. 5. For example, the processor can execute a voting algorithm to using the respective classifications of each image in which the object was detected. In an embodiment, the processor can execute a majority voting algorithm, in which the classification that occurs most common in the images in which an object (e.g., sharing a common tracking identifier) is detected is chosen as the corrected classification.

In another embodiment, the processor can execute a normalized weighted voting algorithm. In doing so, the processor can divide the instances in which the object was detected in the sequence of images (e.g., sharing a common tracking identifier) into groups according to the distance of the object from the autonomous vehicle that captured the sequence of images. The remote server can determine a weight value for each group, corresponding to the classification accuracy at different predetermined distances, for example. The server can determine a candidate class label based on confidence values (e.g., generated by the artificial intelligence model that detected the bounding box in the sequence of images) associated with the detected bounding box or the respective classification. Candidate class label may be a majority vote among classifications in the group (e.g., the most common classification is the candidate classification for the group). The processor can determine a weight value for the candidate class label of each group based on a distance coefficient for the respective group. The weight value may be equal to the distance coefficient multiplied by the confidence value of the classification for the image (or majority classification for the group). The processor can calculate the weighted sum of class confidence among groups to determine the voted class label among the groups. The voted class label can be utilized as the corrected classification for the respective object.

In some implementations, the processor can detect one or more images in a consecutive sequence of images in which detection of an object (e.g., generation of an accurate bounding box) has failed. For example, the processor can iterate through a sequence of images and identify whether bounding boxes corresponding to a common tracking identifier appear in consecutive images. If one or more images between two images where an object was successfully detected are missing a bounding box for the common tracking identifier of an object, the processor can determine that the respective bounding box is missing in those one or more images. The processor can generate a corrected bounding box for the object by estimating the position and size of the bounding box for the image in which the object failed to be detected. To do so, the processor can execute the CSRT tracking algorithm (or another suitable tracking algorithm) to estimate the position and position and size of a bounding box for the object in the image given the previous image in the sequence in which the object was correctly detected. The server can perform the aforementioned correction techniques for each object detected in the sequence of images, and may perform said techniques in response to receiving an additional image in the sequence as the autonomous vehicle operates.

At step 625, the processor can provide the correction to an autonomous navigation process of the autonomous vehicle. Upon generating corrections in images, the processor can provide the corrected classifications to an autonomous navigation process, which may be at least partially responsible for controlling the autonomous vehicle. The autonomous navigation process may process the classifications, locations, and other information derived from the sequence of images to control operations of the autonomous vehicle. The processor may provide the correction via inter-process communication, via a network interface, or another type of communication interface. In an embodiment, the processor may provide the images, bounding box information, distance information, or other received information in addition to the correction. In an embodiment, the processor itself may execute the autonomous navigation process, and may utilize the correction directly controlling the autonomous vehicle.

Referring to FIGS. 7A, 7B, and 7C, depicted are consecutive images in a sequence of images in which a misclassification occurs, according to an embodiment. As shown, FIGS. 7A, 7B, and 7C each show images that capture the FOV in front of a vehicle while the vehicle is traveling on a roadway. Each of the images 700A, 700B, and 700C of FIGS. 7A, 7B, and 7C were captured consecutively and provided as input to an artificial intelligence model (e.g., the artificial intelligence model 310, the artificial intelligence model(s) 411, etc.). As shown in the image 700A of FIG. 7A, a car has been detected, and a corresponding bounding box 705A has been generated to represent the location and size of the car as depicted in the image. Additionally, the car has been classified with the class label 710A as "car," with a confidence value of 0.94. Renderings similar to the image 700A, including images of bounding boxes and class labels, may be provided by a server (e.g., the server 410*a*, etc.) or another type of computing device.

In the image 700B of FIG. 7B, which was captured subsequent to the image 700A of FIG. 7A, the car has again been detected and a corresponding bounding box 705B has been generated. Although not shown here, the bounding box 705B and the bounding box 705A share a common tracking identifier, which may be utilized to correct incorrect classification of the car. As shown, the car has been incorrectly classified with the class label 710B as "SUV," with a lower confidence value of 0.44. Such misclassifications may occur due to low-resolution, occlusion, or unusual yaw angles. In the image 700C of FIG. 7C, which was captured subsequent to the image 700B of FIG. 7B, the car has been detected and a corresponding bounding box 705C has been generated. Although not shown here, the bounding box 705C, the bounding box 705B, and the bounding box 705A share a common tracking identifier, which may be utilized to correct incorrect classification of the car. In the image 700C, the car has again been correctly classified with the class label 710C as "car" with a confidence value of 0.86. Using the techniques described herein, the misclassification that occurred when processing the image 700B can be automatically corrected in real-time or near real-time, to improve the operational performance of the autonomous vehicle.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:

identifying, by one or more processors coupled to non-transitory memory, a respective classification and a respective bounding box generated using an artificial intelligence model for an object depicted in each image of a sequence of images captured during operation of an autonomous vehicle;

tracking, by the one or more processors, the object in the sequence of images based on the respective bounding box of each image of the sequence of images and a tracking identifier corresponding to the object;

determining, by the one or more processors, a correction to the respective classification of at least one image of the sequence of images responsive to tracking the object in the sequence of images, determining the correction further comprising:

calculating, by the one or more processors, a number of images in the sequence of images having the same respective classification for the object; and training, by the one or more processors, the artificial intelligence model based on the correction, wherein tracking the object further comprises executing, by the one or more processors, a voting algorithm based on the number of images in the sequence of images having the same respective classification for the object.

2. The method of claim 1, wherein tracking the object in the sequence of images comprises determining, by the one or more processors, a predicted position of the respective bounding box of a second image of the sequence of images based on the respective bounding box of a first image of the sequence of images.

3. The method of claim 1, wherein the voting algorithm comprises assigning, by the one or more processors, for the voting algorithm, a respective weight value to the respective classification of each image of the sequence of images in which the object was tracked.

4. The method of claim 1, further comprising:

providing, by the one or more processors, the artificial intelligence model to an autonomy system of the autonomous vehicle.

5. The method of claim 1, wherein tracking the object in the sequence of images comprises determining, by the one or more processors, a distance of the object from the autonomous vehicle.

6. A system, comprising:

one or more processors coupled to memory, the one or more processors configured to:

identify a respective classification and a respective bounding box generated using an artificial intelligence model for an object depicted in each image of a sequence of images captured during operation of an autonomous vehicle;

track the object in the sequence of images based on the respective bounding box of each image of the sequence of images and a tracking identifier corresponding to the object;

determine a correction to the respective classification of at least one image of the sequence of images responsive to tracking the object in the sequence of images, determine the correction further comprising:

calculate a number of images in the sequence of images having the same respective classification for the object; and train the artificial intelligence model based on the correction, wherein the one or more processors are further configured to track the object by executing a voting algorithm based on the number of images in the sequence of images having the same respective classification for the object.

7. The system of claim 6, wherein the one or more processors are further configured to:

determine a predicted position of the respective bounding box of a second image of the sequence of images based on the respective bounding box of a first image of the sequence of images.

8. The system of claim 6, wherein the one or more processors are further configured to:

assign, for the voting algorithm, a respective weight value to the respective classification of each image of the sequence of images in which the object was tracked.

9. The system of claim 6, wherein the one or more processors are further configured to:

provide the artificial intelligence model to an autonomy system of the autonomous vehicle.

10. The system of claim 6, wherein the one or more processors are further configured to:

determine a distance of the object from the autonomous vehicle.

11. An autonomous vehicle having a processor configured to:

receive a sequence of images captured during operation of the autonomous vehicle;

generate, using an artificial intelligence model, a respective classification and a respective bounding box for an object depicted in each image of the sequence of images;

track the object in the sequence of images based on the respective bounding box of each image of the sequence of images and a tracking identifier corresponding to the object;

determine a correction to the respective classification of at least one image of the sequence of images responsive to tracking the object in the sequence of images, determine the correction further comprising:

calculate a number of images in the sequence of images having the same respective classification for the object; and provide the correction to an autonomous navigation process of the autonomous vehicle, wherein the processor is further configured to track the object by executing a voting algorithm based on the number of images in the sequence of images having the same respective classification for the object.

12. The autonomous vehicle of claim 11, wherein the processor is further configured to determine a distance of the object from the autonomous vehicle.

13. The autonomous vehicle of claim 11, wherein the processor is further configured to:

determine a predicted position of the respective bounding box of a second image of the sequence of images based on the respective bounding box of a first image of the sequence of images.

14. The autonomous vehicle of claim 11, wherein the processor is further configured to:

assign, for the voting algorithm, a respective weight value to the respective classification of each image of the sequence of images in which the object was tracked.

* * * * *